(12) United States Patent
White et al.

(10) Patent No.: US 8,041,830 B2
(45) Date of Patent: *Oct. 18, 2011

(54) MEDIA DOWNLOAD METHOD AND SYSTEM BASED ON CONNECTION SPEED

(75) Inventors: Scott White, Austin, TX (US); Paul Van Vleck, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,245

(22) Filed: Nov. 8, 2010

(65) Prior Publication Data

US 2011/0047284 A1 Feb. 24, 2011

Related U.S. Application Data

(63) Continuation of application No. 11/199,799, filed on Aug. 9, 2005, now Pat. No. 7,860,962.

(51) Int. Cl.
G06F 15/16 (2006.01)
(52) U.S. Cl. ........................................ 709/231; 709/232
(58) Field of Classification Search .................. 709/231, 709/232, 233
See application file for complete search history.

(56) References Cited

U.S. PATENT DOCUMENTS

| 6,292,834 B1 | 9/2001 | Ravi et al. |
|---|---|---|
| 6,848,004 B1 | 1/2005 | Chang et al. |
| 2002/0054578 A1 | 5/2002 | Zhang et al. |
| 2004/0193648 A1 | 9/2004 | Lai et al. |
| 2004/0226048 A1 | 11/2004 | Alpert et al. |
| 2004/0267952 A1 | 12/2004 | He et al. |
| 2005/0066339 A1 | 3/2005 | Thoen |

OTHER PUBLICATIONS

International Search Report for International Application No. PCT/US 06/25825, Mailed on Feb. 5, 2008.
Written Opinion of the International Searching Authority for PCT/US 06/25825, Mailed on Feb. 5, 2008.

*Primary Examiner* — Joseph Avellino
*Assistant Examiner* — Marshall McLeod
(74) *Attorney, Agent, or Firm* — Toler Law Group

(57) ABSTRACT

A method and system of offering a video file to a video receiver includes offering a progressive download, but not a non-progressive full download, of the video file to the video receiver via a network connection when a connection speed satisfies a first threshold value. The method includes offering the non-progressive full download, but not the progressive download, of the video file to the video receiver via the network connection when the connection speed is less than a second threshold value. The second threshold value is based on a bit rate at which the video file is encoded.

20 Claims, 3 Drawing Sheets

MEDIA DOWNLOAD METHOD AND SYSTEM BASED ON CONNECTION SPEED

CLAIM OF PRIORITY

The present application claims priority from and is a continuation of patent application Ser. No. 11/199,799, now U.S. Pat. No. 7,860,962, filed on Aug. 9, 2005 and entitled "Media Download Method And System Based On Connection Speed," the content of which is expressly incorporated herein by reference in its entirety.

FIELD OF THE DISCLOSURE

The present disclosure relates to methods and systems for downloading video content.

BACKGROUND

Movies and other video content items are often digitally-encoded at a high bit rate, such as 900 kilobits per second (kbps), so that its resulting playback quality is desirable. However, some people have an Internet connection whose connection speed is significantly less than the bit rate of the movies. As a result, interruptions may occur when these people attempt real-time, streaming playbacks of the movies.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION

Embodiments of the present disclosure provide a video server that offers either a non-progressive full download or a progressive download, but not both, of a video file to a video receiver based on a speed of a network connection to the video receiver. Other embodiments provide a video receiver that determines whether to pull a non-progressive full download or a progressive download of a video file from a video server based on a speed of a network connection to the video receiver.

In an embodiment, a computer readable medium stores processor-executable instructions that when executed by a processor, causes the processor to offer a progressive download, but not a non-progressive full download, of a video file to a video receiver via a network connection when a connection speed satisfies a first threshold value of 768 kilobits per second. The method includes offering the non-progressive full download, but not the progressive download, of the video file to the video receiver via the network connection when the connection speed is less than a second threshold value. The second threshold value is based on a bit rate at which the video file is encoded. The video file is encoded at a rate of at least 900 kilobits per second.

In another embodiment, a system includes a processor and a memory. The memory is configured to store instructions to offer a progressive download, but not a non-progressive full download, of a video file to a video receiver via a network connection when a connection speed of the network connection is greater than or equal to a first threshold value of 768 kilobits per second. The memory is configured to store instructions to offer the non-progressive full download, but not the progressive download, of the video file to the video receiver via the network connection when the connection speed of the network connection is less than a second threshold value. The second threshold value is based on a bit rate at which the video file is encoded. The video file is encoded at a rate of at least 900 kilobits per second.

In another embodiment, a system includes a processor to download a progressive download, and inhibit pulling a non-progressive full download, of a video file to a video receiver via a network connection when a connection speed of the network connection to the video receiver satisfies a first threshold value of 768 kilobits per second.

Figure 1:
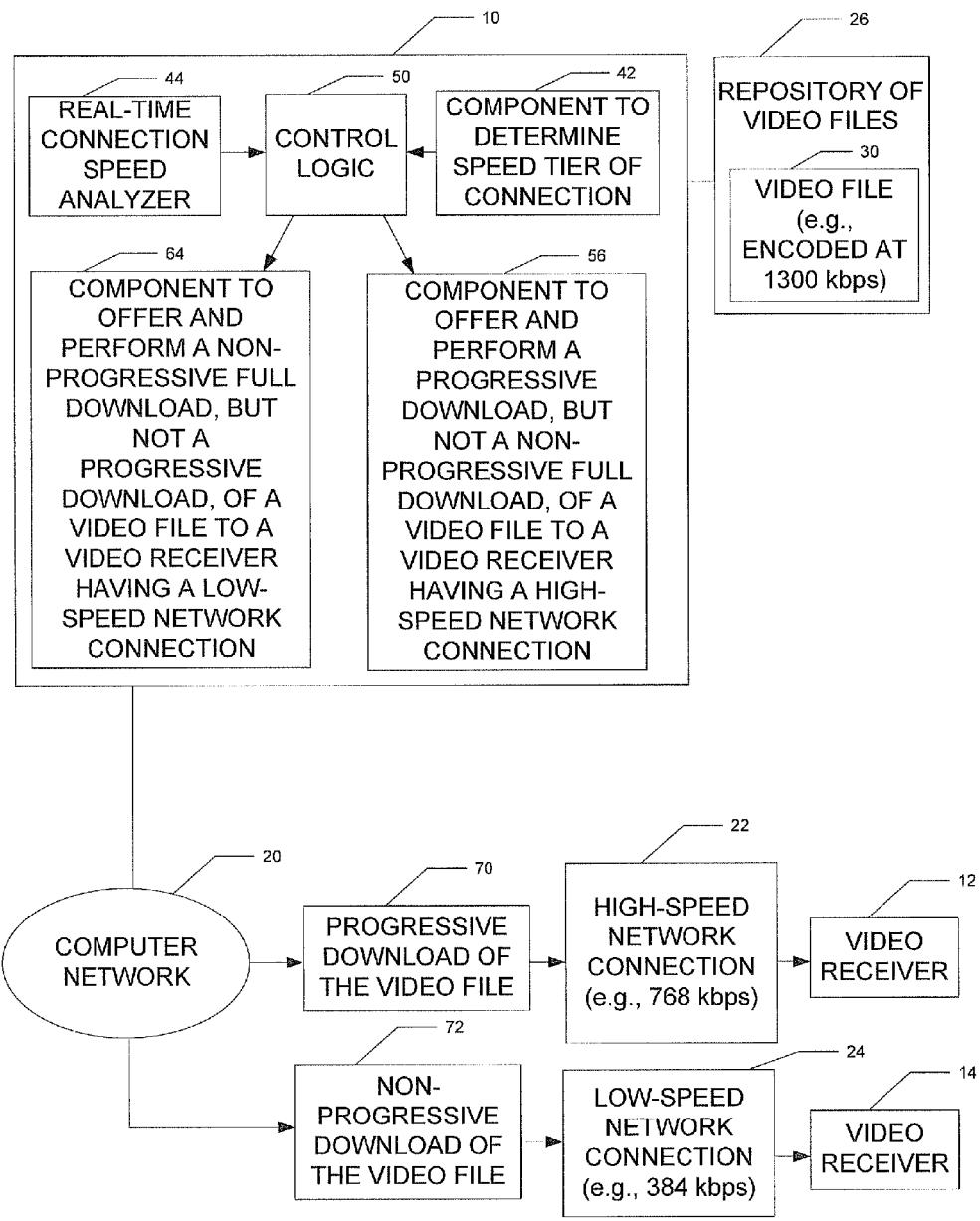
FIG. 1 is block diagram of an embodiment of a video file downloading system.

FIG. 1 is block diagram of an embodiment of a video file downloading system. The video file downloading system comprises a video server 10 that serves multiple clients including a video receiver 12 and a video receiver 14. The clients, including the video receivers 12 and 14, use the video server 10 to download one or more video files to their user locations via a computer network 20. The video receivers 12 and 14 playback their downloaded video files for display by a video display device.

Examples of the clients include, but are not limited to, video set-top box receivers, television receivers, personal computers, personal digital assistants, gaming devices (e.g. Sony's PLAYSTATION or Microsoft's X-BOX), wireless video devices and wireless telephones. Examples of the computer network 20 include, but are not limited to, the Internet, a digital subscriber line (DSL) network, a cable-television-plant-based computer network, a wireless data network such as a 3G network, an intranet, an extranet, or any combination thereof.

The clients may be located at different customer premises. For example, the video receiver 12 may be located at a first customer premise, and the video receiver 14 may be located at a second customer premise, where the first customer premise differs from the second customer premise. Optionally, two or more clients may be located at the same customer premise. Some of the clients may be portable, in which case their locations can vary.

Each of the clients has its own respective network connection to the computer network 20. In particular, the video receiver 12 has a network connection 22 to the computer network 20, and the video receiver 14 has a network connection 24 to the computer network 20.

Each network connection has its own connection speed. Each connection speed may be based on a respective speed tier to which its associated customer has subscribed from a network service provider. For example, a customer associated with the network connection 22 may subscribe to a high-speed tier connection and a customer associated with the network connection 24 may subscribe to a low-speed tier connection. For purposes of illustration and example, consider the network connection 22 having a connection speed of 768 kbps or another high speed connection to the video receiver 12, and the network connection 24 having a connection speed of 384 kbps or another low speed connection to the video receiver 14. However, it is noted that 768 kbps may be considered a low speed in other examples, embodiments and applications.

The video files to be downloaded are retrieved by the video server 10 from a repository 26 that stores many video files including an illustrative video file 30. The video files may comprise movies, television programs, music videos and other video content items. The video server 10 and the repository 26 may be associated with an Internet Protocol Television (IPTV) service or another video downloading service that serves video files to its customers in either an on-demand mode, a near-on-demand mode, or a broadcast mode.

Figure 2:
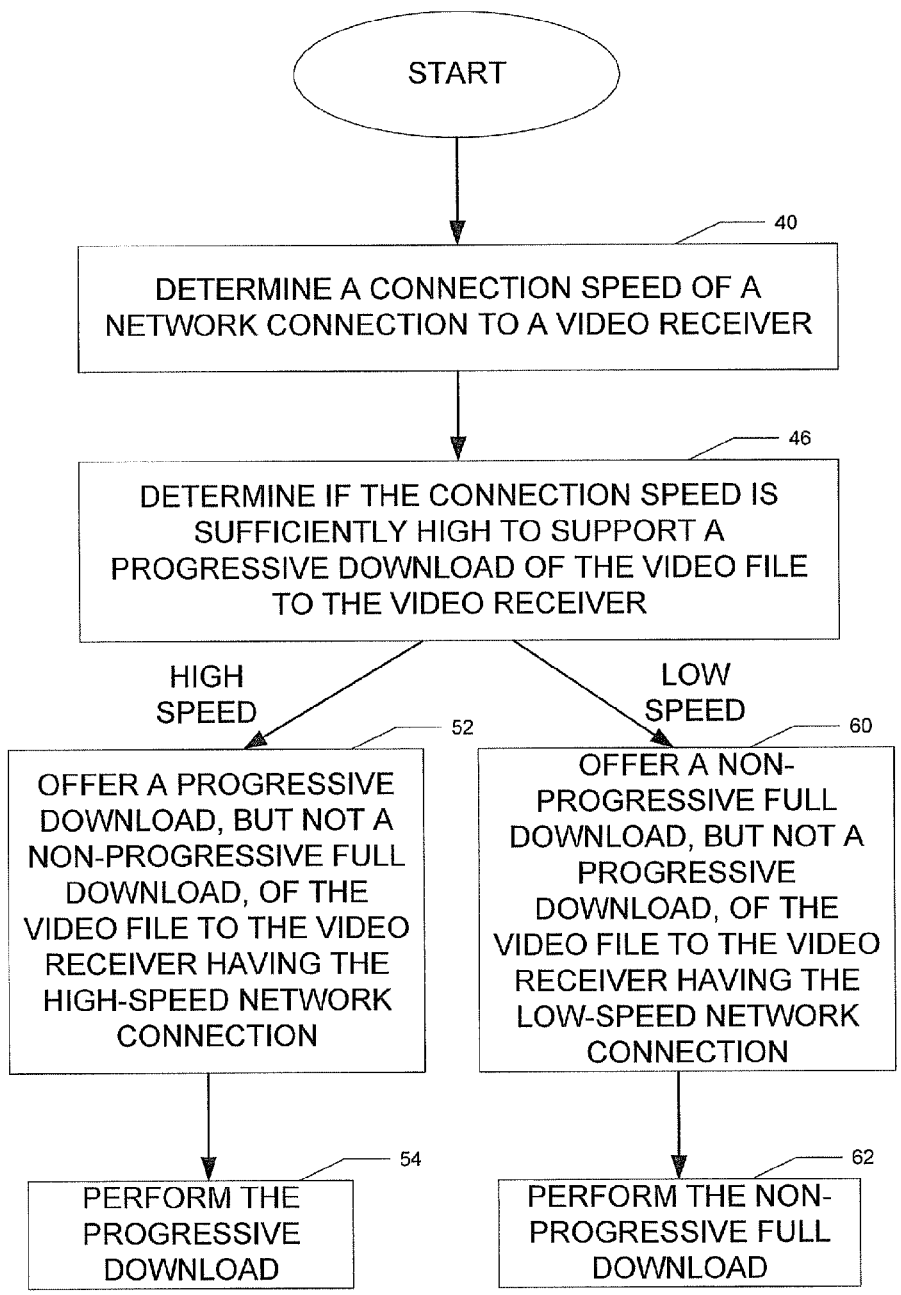
FIG. 2 is a flow chart of an embodiment of a method of serving a video file to a video receiver using the video downloading system of FIG. 1.

FIG. 2 is a flow chart of an embodiment of a method of serving a video file to a video receiver using the video downloading system of FIG. 1.

As indicated by block 40, the method comprises determining a connection speed of the network connection to the video receiver. The connection speed can be determined by a component 42 of the video server 10 that determines a speed tier of the network connection. Alternatively, the connection speed can be determined by a real-time connection speed analyzer 44 of the video server 10. The analyzer 44 performs a real-time analysis of the connection speed of the network connection to the video receiver.

As indicated by block 46, the method comprises determining if the connection speed is sufficiently high to support a progressive download of the video file to the video receiver. This act may comprise comparing the connection speed to at least one threshold value. If the connection speed is greater than or equal to a first threshold value, the connection speed is deemed to be high enough to support a progressive download of the video file to the video receiver. If the connection speed is less than a second threshold value, the connection speed is deemed to be too low to support a progressive download of the video file to the video receiver.

In one embodiment, the first threshold value is either equal to or about equal to the second threshold value. Alternatively, the first threshold value may be greater than the second threshold value.

The first threshold value and the second threshold value may be based on a rate at which the video file is encoded, and/or a size of the video file, and/or an allowance for overhead. The allowance for overhead may be a fixed percentage of the size of the video file. Alternatively, the first threshold value and the second threshold value may be independent of the rate at which the video file is encoded and/or a size of the video file.

In one embodiment, the first and second threshold values are about 768 kbps. These threshold values are suitable for some video items encoded at rates of about 900 kbps or greater, and for some video items encoded at rates of about 1300 kbps or greater. In general, the video items may be encoded at rates greater than or equal to the first and second threshold values.

The act of determining if the connection speed is sufficiently high to support a progressive download of the video file is performed by control logic 50 of the video server 10. The control logic 50 is responsive to one or more of the component 42, the analyzer 44, data indicating a rate at which the video file is encoded, and data indicating a size of the video file, to make this determination.

As indicated by block 52, the video server 10 offers a progressive download, but not a non-progressive full download, of the video file to the video receiver if its connection speed is greater than or equal to the first threshold. As indicated by block 54, the video server 10 performs the progressive download of the video file to the video receiver if so requested by a user of the video receiver. A component 56 of the video server 10 performs the acts indicated by blocks 52 and 54.

As indicated by block 60, the video server 10 offers a non-progressive full download, but not a progressive download, of the video file to the video receiver if its connection speed is less than the second threshold. As indicated by block 62, the video server 10 performs the non-progressive full download of the video file to the video receiver if so requested by a user of the video receiver. A component 64 of the video server 10 performs the acts indicated by blocks 60 and 62.

For purposes of illustration and example, consider a user of the video receiver 12 and a user of the video receiver 14 both wishing to download the video file 30. This scenario illustrates how the video server 10 serves the same video file 30, but in different download modes, to the video receivers 12 and 14 in accordance with the method of FIG. 2.

Based on its connection speed being at least 768 kbps, the network connection 22 to the video receiver 12 is deemed to be a high-speed connection by either the component 42 or the analyzer 44. Therefore, the component 56 offers a progressive download, but not a non-progressive full download, of the video file 30 to the video receiver 12.

The video receiver 12 requests, receives and buffers a progressive download 70 of the video file 30 from the video server 10. The video receiver 12 begins playing the video file 30 for display to its viewers before the progressive download 70 has completed. The remainder of the video file 30 is downloaded concurrently with the playback.

Preferably, the video receiver 12 begins playback when enough of the video file 30 has been downloaded to substantially ensure an unbroken playback of all of the video file 30. As used herein, "substantially" ensuring the unbroken playback means that the unbroken playback occurs significantly more often than not. However, the unbroken playback is not necessarily guaranteed for all conditions, such as if the network connection 22 were to malfunction while the remainder of the video file 30 is being downloaded, for example.

The amount of time that the video receiver 12 buffers the video file 30 prior to playback is related to the size of the video file 30 and the connection speed of its network connection 22. For example, a typical 1300 kbps full-length movie having a length of about 90 minutes may be buffered for about 38 minutes prior to starting playback if being progressively downloaded over a 768 kbps Internet connection. The calculation of this value considers a potential for congestion in the computer network 20, a potential for conflicting traffic in the network connection 22 (e.g. by other household members using the Internet connection), and overhead. Under these conditions, a network analysis may determine that about 26% of the video file 30 may be downloaded prior to playback to substantially ensure an unbroken playback by the video receiver 12. For an unbroken playback, the buffer of the video receiver 12 will have non-consumed video data throughout playback of the video file 30 (until the end of the playback).

Based on its connection speed being less than 768 kbps, the network connection 24 to the video receiver 14 is deemed to be a low-speed connection by either the component 42 or the analyzer 44. Therefore, the component 64 offers a non-progressive full download, but not a progressive download, of the video file 30 to the video receiver 14.

The video receiver 14 requests, receives and stores a non-progressive full download 72 of the video file 30 from the video server 10. The video receiver 14 can write the video file 30 to a mass storage device such as a hard disk. After the non-progressive full download 72 has completed, the video receiver 14 can begin playing the video file 30 for display to its viewers.

The video server 10 offers, to the video receiver 14, the non-progressive full download instead of the progressive download because of a greater amount of time involved in buffering. For example, about 82% of the typical 1300 kbps full-length movie may be buffered for a progressive download over a 384 kbps Internet connection. This buffering process would continue for about 8 hours prior to starting playback. Further, a low speed network connection is more susceptible to the ill effects of network congestion and conflicting traffic to cause an interrupted playback.

Thus, using the method of FIG. 2, the video server 10 switches between the progressive and non-progressive full download modes either dynamically or statically. The video server 10 can dynamically switch modes based on a real-time measure of a user's current connection speed. Dynamically switching modes is useful for clients whose connection speeds are time-varying, and portable clients whose connection speeds differ for different locations. For example, a wireless client may perform progressive downloads when located in areas served by a high-speed wireless access point and/or a high-speed wireless data network, and may perform non-progressive full downloads when located in areas served by a low-speed wireless access point and/or a low-speed wireless data network. Either alternatively or additionally, the video server 10 can statically switch modes based on a user's speed tier (e.g. all users signed up for 384 kbps Internet service receive movies in the non-progressive full download mode, and all users signed up for 768 kbps Internet service receive movies in the progressive download mode). Switching modes helps ensure a high-quality, unbroken playback experience for low-bandwidth users while reducing download times for high-bandwidth users.

Either as an alternative to or in addition to the video server 10 determining the download mode, a home gateway or the video receiver 12 or 14 may act to determine the download mode. In this case, the home gateway or the video receiver 12 or 14 determines whether to pull a non-progressive full download or a progressive download of the video file 30 from the video server 10 based on a speed of the network connection 22 or 24 to the video receiver 12 or 14.

Each of the video receivers 12 and 14 (or a respective home gateway in communication therewith) may comprise its own speed-tier-determining component and/or real-time connection speed analyzer to perform the act indicated by block 40. Each of the video receivers 12 and 14 (or its home gateway) may comprise control logic to perform the act indicated by block 46. Each of the video receivers 12 and 14 (or its home gateway) may comprise a component to pull a progressive download, and inhibit pulling a non-progressive full download, of the video file from the video server 10 if the control logic deems the connection speed as being sufficiently high to support the progressive download (e.g. the connection speed is greater than or equal to the first threshold). Each of the video receivers 12 and 14 (or the home gateway) may comprise a component to pull a non-progressive full download, and inhibit pulling a progressive download, of the video file from the video server 10 if the control logic deems the connection speed as not being sufficiently high to support the progressive download (e.g. the connection speed is less than the second threshold).

The herein-disclosed acts performed by the video server 10, the video receivers 12 and 14, and the home gateway may be directed by a respective processor that is programmed by respective computer-readable program code stored by a respective computer-readable medium.

It will be apparent to those skilled in the art that the disclosed embodiments may be modified in numerous ways and may assume many embodiments other than the particular forms specifically set out and described herein.

Figure 3:
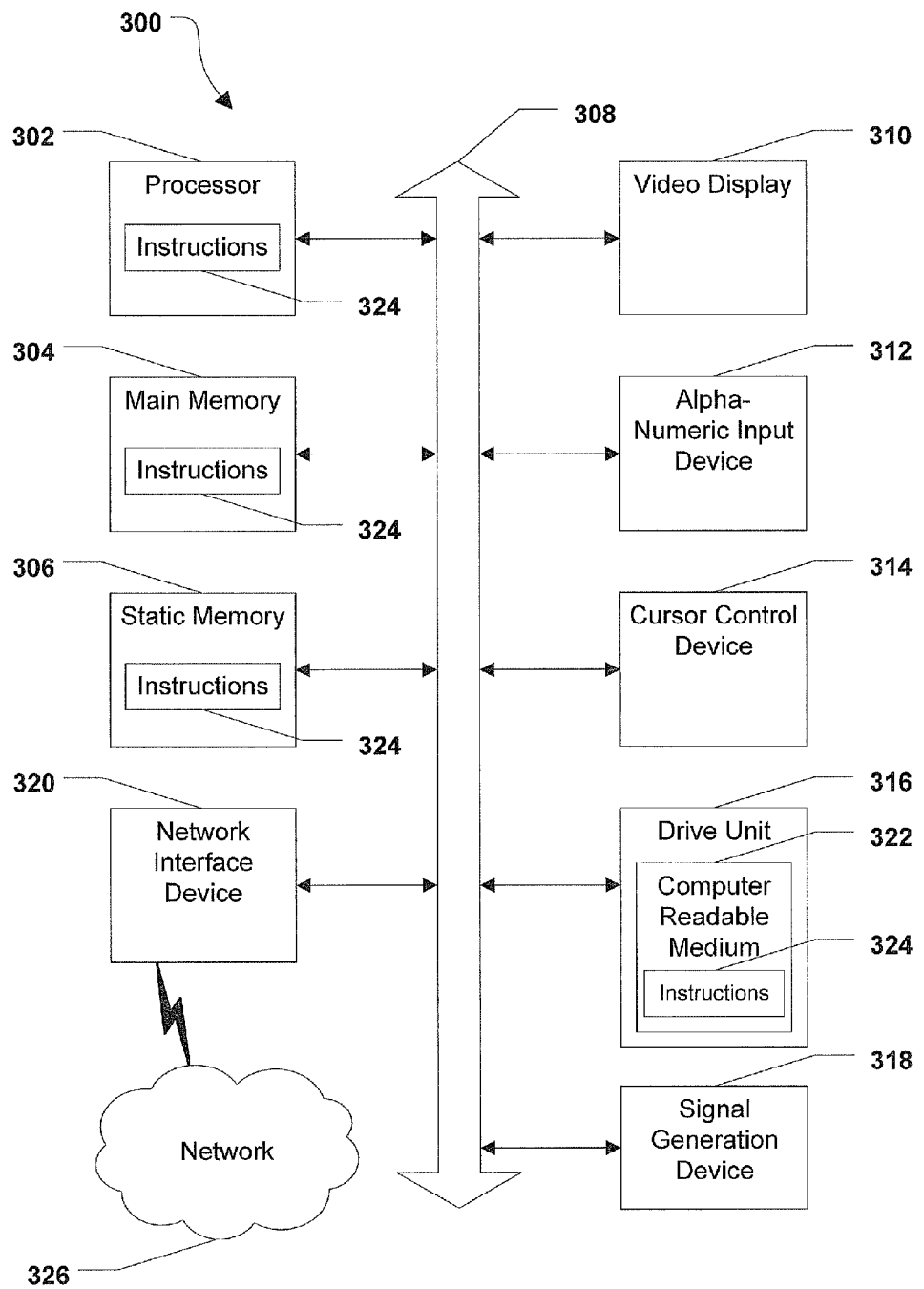
FIG. 3 is a diagram of an illustrative embodiment of a general computer system.

Referring to FIG. 3, an illustrative embodiment of a general computer system is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306, that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer readable medium comprising processor-executable instructions that when executed by a processor, cause the processor to:
    offer a progressive download, but not a non-progressive full download, of a video file to a video receiver via a network connection when a connection speed of a network connection satisfies a first threshold value of 768 kilobits per second; and
    offer the non-progressive full download, but not the progressive download, of the video file to the video receiver via the network connection when the connection speed is less than a second threshold value, wherein the second threshold value is based on a bit rate at which the video file is encoded, wherein the video file is encoded at a rate of at least 900 kilobits per second.

2. The non-transitory computer readable medium of claim 1, wherein the connection speed is based on a speed tier to which a user of the video receiver subscribed.

3. The non-transitory computer readable medium of claim 1, further comprising processor-executable instructions that when executed by the processor, cause the processor to perform the progressive download of the video file to the video receiver via the network connection when the connection speed is greater than or equal to the first threshold value.

4. The non-transitory computer readable medium of claim 1, further comprising processor-executable instructions that when executed by the processor, cause the processor to determine the connection speed of the network connection by determining a speed tier to which a user of the video receiver has subscribed, wherein the speed tier is associated with the network connection.

5. The non-transitory computer readable medium of claim 1, wherein the connection speed is determined by performing a real-time analysis of the connection speed of the network connection.

6. The non-transitory computer readable medium of claim 1, wherein the second threshold value is equal to the first threshold value.

7. The non-transitory computer readable medium of claim 1, further comprising processor-executable instructions that when executed by the processor, cause the processor to switch dynamically between a progressive download mode and a non-progressive full download mode in response to a real-time measure of the connection speed of the network connection.

8. The non-transitory computer readable medium of claim 7, wherein the connection speed of the network connection is dependent on a location of a user.

9. A system comprising:
   a processor; and
   a memory configured to store instructions executable by the processor to:
      offer a progressive download, but not a non-progressive full download, of a video file to a video receiver via a network connection when a connection speed of the network connection is greater than or equal to a first threshold value of 768 kilobits per second; and
      offer the non-progressive full download, but not the progressive download, of the video file to the video receiver via the network connection when the connection speed of the network connection is less than a second threshold value, wherein the second threshold value is based on a bit rate at which the video file is encoded, wherein the video file is encoded at a rate of at least 900 kilobits per second.

10. The system of claim 9, wherein the connection speed of the network connection is based at least in part on a speed tier to which a user of the video receiver subscribed.

11. The system of claim 9, wherein the system is operable to dynamically switch from offering the progressive download to offering the non-progressive full download based on a real-time measure of the connection speed.

12. The system of claim 9, wherein the system is to perform the non-progressive full download of the video file to the video receiver via the network connection when the connection speed of the network connection is less than the second threshold value.

13. The system of claim 9, wherein the system comprises a component to determine the connection speed of the network connection based on a speed tier of the network connection.

14. The system of claim 9, wherein the system is associated with an internet protocol television service.

15. A system comprising:
   a processor to download a progressive download, and inhibit downloading a non-progressive full download, of a video file to a video receiver via a network connection when a connection speed of the network connection to the video receiver satisfies a first threshold value of 768 kilobits per second.

16. The system of claim 15, wherein the processor is to download the non-progressive full download, and inhibit downloading the progressive download, of the video file to the video receiver via the network connection when the connection speed is less than a second threshold value, wherein the second threshold value is based on a bit rate at which the video file is encoded, wherein the video file is encoded at a rate of at least 900 kilobits per second.

17. The system of claim 15, wherein the processor determines the connection speed of the network connection to the video receiver via a real-time connection speed analyzer.

18. The system of claim 17, wherein the connection speed is based at least in part on a speed tier statically assigned to a subscriber of a communication service corresponding to the network connection.

19. The system of claim 15, wherein the processor is part of a home gateway in communication with the video receiver.

20. The system of claim 15, wherein the processor determines the connection speed of the network connection to the video receiver based on a speed tier of the network connection.

* * * * *